US008768856B2

(12) United States Patent
Simrell (10) Patent No.: US 8,768,856 B2
(45) Date of Patent: Jul. 1, 2014

(54) AMBER ALERT SYSTEM AND METHOD FOR LOCATING MISSING CHILDREN

(75) Inventor: Roy Simrell, Largo, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 3700 days.

(21) Appl. No.: 11/153,377

(22) Filed: Jun. 16, 2005

(65) Prior Publication Data

US 2006/0287872 A1    Dec. 21, 2006

(51) Int. Cl.
*G06Q 99/00*    (2006.01)
(52) U.S. Cl.
USPC ......................................................... 705/325
(58) Field of Classification Search
USPC ..................................................... 705/1, 325
See application file for complete search history.

(56) References Cited

U.S. PATENT DOCUMENTS

| | | | | |
|---|---|---|---|---|
| 6,505,203 | B1 * | 1/2003 | Adler | 707/10 |
| 2003/0061100 | A1 * | 3/2003 | Minowa | 705/14 |
| 2003/0208560 | A1 * | 11/2003 | Inoue et al. | 709/219 |
| 2004/0080421 | A1 * | 4/2004 | Wunderlich | 340/573.4 |
| 2005/0012624 | A1 * | 1/2005 | Charen et al. | 340/573.4 |
| 2006/0000126 | A1 * | 1/2006 | Bair | 40/124.01 |
| 2006/0095331 | A1 * | 5/2006 | O'Malley et al. | 705/22 |

OTHER PUBLICATIONS

May 16, 2005, ADVO website homepage, http://www.advo.com/ viewed May 16, 2005.
May 16, 2005, "About ADVO—Corporate Citizenship," http://www.advo.com/corpcitizenship.html, viewed May 16, 2005.

* cited by examiner

*Primary Examiner* — Jami A Plucinski
(74) *Attorney, Agent, or Firm* — Pillsbury Winthrop Shaw Pittman LLP (57) ABSTRACT

A system and method for distributing information regarding a child abduction. More particularly, a system and method for distributing AMBER alert information via a computer system network to consumers at retail stores. AMBER alert distribution criteria is used to determine what retail stores to transmit the AMBER alert information to, and CID criteria is used to determine what consumers within those retail stores to transmit the information to. As time progresses the AMBER alert information is distributed to retail stores in a larger geographic scope.

31 Claims, 5 Drawing Sheets

Purchase History Database Record 206

| | |
|---|---|
| transaction ID | 300 |
| consumer identification | 310 |
| product code | 320 |
| product description | 330 |
| product purchase price | 340 |
| date of transaction | 350 |
| time of transaction | 360 |
| location of transaction | 370 |

FIG. 3

AMBER Alert Database Record 211

| | |
|---|---|
| description of child | 400 |
| description of suspect | 410 |
| description of suspect's vehicle | 420 |
| picture of child | 430 |
| picture of suspect | 440 |
| picture of suspect's vehicle | 450 |
| location of abduction | 460 |
| time of abduction | 470 |
| picture of vehicle make/model/color | 480 |

AMBER ALERT SYSTEM AND METHOD FOR LOCATING MISSING CHILDREN

BACKGROUND OF THE INVENTION

1. Field of the Invention

This invention relates generally to a system and method for effectively distributing information regarding abducted children, and more particularly, to effectively mass distributing AMBER alert information to consumers.

2. Background Art

AMBER is an acronym for America's Missing: Broadcast Emergency Response.

EAS stands for the Emergency Alert System. An EAS is a system that broadcasts information on emergencies, such as child abductions.

An AMBER alert is a notification containing a description of an abducted child, and optional additional information, such as suspected abductor of the child, that is broadcast using the EAS and is used in child abduction cases.

Each state or county establishes its own AMBER alert program, which are nationally coordinated. Each AMBER alert program establishes its own AMBER plan criteria. The following criteria is typically met before an alert is activated: (1) law enforcement confirms a child has been abducted; (2) law enforcement believes the circumstances surrounding the abduction indicate that the child is in danger of serious bodily harm or death; and (3) there is enough descriptive information about the child, suspected abductor, and/or suspect's vehicle to believe an immediate broadcast alert will help. Various approaches have been used to broadcast AMBER alerts, including posting the alerts on roadside signs and distributing them via the Internet.

AMBER alert information that is broadcast can include descriptions and pictures of the missing child, the suspected abductor, the suspect's vehicle, and any other information available and valuable to identifying and locating the child and/or suspect. Currently, AMBER alert notifications are implemented as information displayed on roadside signs, information posted via Internet web pages, information posted via Internet feed tickers, information broadcast on TV news crawls, and information postal mailed to members of the general public.

BRIEF SUMMARY OF THE INVENTION

Definitions

Certain terms used in this application are defined below. In addition, some examples of some definitions are provided to clarify those definitions.

CID is an acronym for Consumer Identification.

A CID, in this application, means any identifier that can be scanned, read, or otherwise entered into a computer system or terminal to identify a consumer.

The term "consumer" includes families, households and/or other groups of people that use the same CID.

Examples of CIDs include credit card numbers, debit card numbers, social security card numbers, driver's license numbers, license plate numbers, checking account numbers, street addresses, names, e-mail addresses, telephone numbers, frequent consumer card numbers, shopper card identifications (SCIDs), biometric scan indicia (for example, machine identified fingerprints, face recognition, or retinal pattern), shopper loyalty card numbers, arbitrary personal identification numbers or passwords, and identification codes uniquely associated with the consumer or the consumer's household.

Purchase, in this application, means a transaction involving at least two parties in which forms of payment such as cash, check, charge, debit, smart card, gift card, credit slip, or credit is exchanged for one or more goods or services in a retail store.

Purchase data, in this application, includes data associated with purchases, a product code for the product purchased, product description, product purchase price (both list price and actual price paid), date of purchase, time of purchase, transaction ID, location of purchase, discount amount and discount type, and type of payment, typically, in association with a CID.

Real time, in this application, refers to the actual time it takes to do something.

Retail store, in this application, refers to a store in which products and services are stored and are sold to consumers.

Examples of retail stores include supermarkets, restaurants, convenience stores, retail clothing stores, gas stations, petroleum stores, wholesalers, farmer's markets, Internet sites, shopping networks, TV infomercials, outlet stores, warehouses, and second-hand stores.

Transaction, in this application, means an exchange involving at least two legal entities. A purchase is a transaction.

Transaction data, in this application, means data associated with a transaction. For example, transaction data may include purchase data, time and date data, CID, transaction terminal ID, and store ID.

Transaction ID, in this application, refers to a unique identification assigned to a transaction by the retail store which is associated with the transaction.

Database, in this application, means data organized in some format in a computer memory that can be accessed by an associated computer system. Such a concept is also referred to as a database management system. Examples of databases include commercial database products such as the Microsoft Access, SQL server, and any set of files stored in computer memory that can be accessed by an associated computer system.

Demographic data, in this application, means statistical data regarding the demographics of the consumer.

Examples of demographics include age, profession, gender, race, ethnicity, education level, marital status, information involving family size, number and age of children, pet ownership, hobbies, and household income.

A POS, in this application, means a point of sale, which is the area where a consumer engages in transactions at a retail store.

A POS terminal, in this application, means an input output device for inputting and outputting information at a POS.

A product code, in this application, is a code associated with a product. A product code may be a code assigned by a company, a retail store, or by an industry standard, such as Universal Product Code (UPC), to a product.

A retail store POS computer system, in this application, refers a computer system operated by a retail store that operatively connects to at least one POS terminal in a retail store.

An incentive local computer system, in this application, refers to a computer system that resides at a retail store and that receives transaction data generated by retail store POS computer system and transmits print instructions to print incentive offers at a printer located in the retail store.

A central computer system, in this application, refers to a computer system which can receive consumer transaction data from a plurality of retail stores and transmit data back to each of those retail stores.

AMBER alert information, in this application, means information that describes any facet of a child abduction.

Examples of AMBER alert information include a description of the abducted child, a description of the suspect, a description of the suspect's vehicle, a picture of the child, a picture of the suspect, a picture of the suspect's vehicle, the location of the abduction, and the time of the abduction.

An AMBER alert computer system, in this application, refers to a computer system which comprises a database containing AMBER alert information.

An AMBER alert distribution decision is a decision to transmit to one or more specified addresses and/or CIDs certain AMBER alert related information.

AMBER alert distribution criteria are criteria that can be applied to corresponding data to make an AMBER alert distribution decision.

An AMBER alert distribution decision engine, in this application, is software installable in one or more computer systems for applying AMBER alert distribution criteria to corresponding data to generate an AMBER alert distribution decision. An AMBER alert distribution decision engine includes code for applying one or more AMBER alert distribution criteria to corresponding data to determine at least item (1) of the following: (1) addresses to which to send AMBER alert information; (2) CIDs associated with each such address; (3) what specific information in an AMBER alert to send to either each such address and/or each CID; and (4) instructions defining what portion of the AMBER alert information to provide and how to provide that information to consumers. An AMBER alert distribution decision engine applies one or more AMBER alert distribution criteria to corresponding data to make an AMBER alert distribution decision.

Address in the context of AMBER alert distribution decisions, means a network address. For example, an address of a retail store POS computer system or an incentive local computer system.

AMBER alert distribution criteria includes at least item (a) of the following types of criteria:

(a) AMBER alert criteria, which are criteria applicable to corresponding AMBER alert information;

(b) retail store criteria, which are criteria applicable to corresponding data relating to retail stores, the retail store POS computer systems at the retail store, and incentive local computer systems at the retail store; and (c) CID criteria, which are criteria applicable to corresponding data relating to CIDs (and their corresponding consumers).

AMBER alert criteria include: (1) the time period since the AMBER alert was first posted by law enforcement; (2) a location identified in the AMBER alert information; (3) jurisdiction identified in the AMBER alert information; (4) location where a suspect lives; (5) locations where a child lives; and (6) locations where the police think a suspect is heading.

Retail store criteria include: retail store and/or retail store chain opt in data or opt out data; retail store POS computer system location; postal codes; jurisdiction; retail store POS computer system printer types; retail store POS computer system image capable printers; retail store POS computer systems color image capable; time of day; retail store POS computer system number of checkout lane IDs; the existence of an incentive local computer system in a retail store; incentive local computer system opt in data or opt out data; incentive local computer system location; incentive local computer system printer types; incentive local computer system printers image capable; incentive local computer system color image capable; number of checkout lane IDs stored in the incentive local computer system; network connection type (dial up or packet switched) to a retail store POS computer system; network connection type to an incentive local computer system; existence of specified code installation on a retail store POS computer system; and existence of a specified code installation on an incentive local computer system.

CID criteria includes criteria for determining to which CIDs to distribute AMBER alert information. Examples of CID criteria include no criteria (distribute AMBER alert information to every consumer), sequential (every second, third, fourth, etc. CID identifier at a POS terminal or in a retail store POS system), random (randomly distribute AMBER alert information to CIDs) specified frequent shoppers, specified demographic data, specified frequency of purchases, specified frequency of visits to a location, specified frequency that a consumer exercises incentives, specified purchase history of the consumer, specified particular circumstances in the consumer's life, specified indicated tastes of the consumer, other characteristics of the consumer associated data that indicates a consumer possesses certain traits, specified purchase of specified items in specified time periods, specified transaction dollar volume, specified transaction frequency, specified associated store, region, address, retail chain, and/or postal code.

Corresponding data in the context of AMBER alert distribution criteria refers to any data to which AMBER alert distribution criteria can be applied. For example, for AMBER alert criteria, any data contained in specified AMBER alert information, and also actual time data including exact time, time of day, week, month, season, and year. For example, for retail store criteria, corresponding data includes whether a retail store or retail chain has opted into or out of receiving AMBER alert information. For example, for CID criteria, corresponding data includes all data associated with a particular CID, including opt in and opt out data, transaction data, demographic data, if any, and any data derivable therefrom, such as frequency, periodicity, and dollar volume of CID associated transactions.

Individual transaction trigger data (sometimes referred to as trigger data) is data corresponding to elements of transaction data that a computer system compares to elements in transaction data for an individual transaction to see if a match exists, and if it does exist, for the computer system to generate a response signal. That response signal may be transmission of print instructions to a printer or transmission of display instructions to a display device. For example, individual transaction trigger data may include a CID and a product identifier, or coupon identifier, or lack of any of the foregoing.

Individual transaction trigger criteria (sometimes referred to as trigger criteria) are criteria applicable by a computer system to a transaction to determine whether the individual transaction trigger data meets the criteria. If it does, the computer system generates a response signal. For example, individual transaction trigger criteria may include a range of CIDs, an identifier of a category of product, coupons, or lack of any of the foregoing.

CID criteria (sometimes referred to as consumer transaction criteria) may include trigger data. For example, the CID criteria may depend upon the existence or lack of existence of trigger data identifying manufacturers, retailers, and brands, stored in association with a CID.

SUMMARY OF THE INVENTION

Objects of the Invention

A primary object of this invention is to assist law enforcement in finding abducted children. A secondary object is to assist law enforcement with finding any other missing persons, including criminals. A tertiary object of this invention is to assist the general public by providing targeted public service announcements.

Another object of this invention is to provide prompt and broad distribution of AMBER alert information to consumers of a retail store most likely to use or want that information.

Another object of this invention is to provide descriptions and photos of criminal suspects, including suspects in child abduction cases, to consumers in retail stores.

Another object of this invention is to identify consumers purchasing items from POS terminals in retail stores.

Another object of this invention is to provide for marketing to consumers in retail stores.

Another object of the invention is to provide a system and method for prompt distribution of AMBER alert information (including photos) to consumers at the POS of retail stores locally, regionally, or nationally.

These and other objects of the invention are provided by a novel computer network system including at least one AMBER alert distribution decision engine, at least one database of corresponding data to which an AMBER alert distribution decision engine can apply AMBER alert distribution criteria to determine addresses in the corresponding data meeting the AMBER alert distribution criteria, network structure for transmitting AMBER alert information from the computer system making the AMBER alert distribution decision to addresses of computer systems specified in the AMBER alert distribution decision, and structure of the computer systems specified in the AMBER alert distribution decision for providing that information in visual form that is understandable to a person in a retail store.

Optionally, the AMBER alert distribution decision engine may also identify CIDs specifying consumers to whom the AMBER alert information should be provided and/or what subset of the AMBER alert information should be provided to a consumer associated with each CID.

The preferred method of conveying the specified AMBER alert information to a human is to print the specified AMBER alert information, including any image information, such as an image of the child or suspect. Preferably, printing occurs at a POS in connection with a transaction at the POS in which a CID associated with a person is recognized by either the corresponding retail store POS computer system or the incentive local computer system while the person is at the POS engaged in the transaction. Alternatively, a computer system associated with the retail store may provide AMBER alert information to consumers by wirelessly transmitting that information from the vicinity of the retail store, via video displays in or near the retail store, to a consumer's cell phone, to a consumer's blackberry, or via printers not adjacent a POS of the retail store.

Elements of the AMBER alert distribution decision engine may reside installed all on one computer system or distributed amongst a variety of computer systems including a central computer system and one or more computer systems associated with each retail store. That portion of the AMBER alert distribution decision engine identifying when and to which retail stores to send AMBER alert information and optionally what subset or all of the AMBER alert information for a specified AMBER alert to send to each retail store preferably resides installed on a central computer system. That portion of the AMBER alert distribution decision engine identifying CIDs to which to provide AMBER alert information may reside installed on a central computer system, a retail store POS computer system, an incentive local computer system, or any combination of the foregoing. That portion of the AMBER alert distribution decision engine that specifies what AMBER alert information to provide to each CID or associated transaction may reside installed on a central computer system, on a retail store POS computer system, on an incentive local computer system, or on any combination of the foregoing.

Preferably, the AMBER alert distribution decision engine applies AMBER alert distribution criteria, including AMBER alert criteria, retail store criteria, and CID criteria to corresponding data to generate targeted AMBER alert distribution decisions. Preferably, the retail store criteria specifies proximity in time and location to a physical location contained in an AMBER alert information so that the resulting addresses of a retail store POS computer systems near the physical location identified in the AMBER alert information are contained in the AMBER alert distribution decision.

In a first embodiment, a central computer system comprises an AMBER alert distribution decision engine and at least one database comprising AMBER alert distribution criteria and corresponding data. The central computer system performs the following functions: receiving AMBER alert information; storing AMBER alert information; receiving retail store information; storing retail store information; receiving transaction data; storing transaction data; determining addresses and CIDs to which to send AMBER alert information; determining all or subsets of received AMBER alert information to provide to each address; transmitting to an address for either or both of a retail store POS computer system and/or incentive local computer system of a retail store AMBER alert information and either or both of trigger data and/or trigger criteria.

Preferably, either the retail store POS computer system or the incentive local computer system at a retail store performs the functions of applying CID criteria to transaction data. Preferably, the same computer system generates instruction for printing the specified AMBER alert information on a printer located at the POS concurrent with the transaction involving the corresponding CID so that the consumer involved in that transaction is provided the AMBER alert information.

Preferably, CID criteria includes individual transaction data that do not qualify for any incentive offers, or that do not qualify for any targeted incentive offers, such as coupons.

Alternatively, CID criteria is a null so that the retail store POS computer system or incentive local computer system prints specified AMBER alert information regardless of the CID associated with the transaction, or regardless of any other transaction data.

Alternatively, CID criteria may specify an individual transaction currency amount upper or lower limit, frequent shopper status, existence of loyalty card account, product category, brand, of any current or past purchases associated with a CID so that only consumers meeting the specified criteria are presented with certain AMBER alert information.

Preferably, the central computer system receives AMBER alert information about child abductions from an AMBER alert system. The structure of the AMBER alert system however is not central to the concepts of this invention. The AMBER alert system may be a wireless broadcast system, a facsimile system, an email system, or the like, that provides AMBER alert information.

Preferably, however, the provided AMBER alert information includes at least (1) machine interpretable location data, such as physical, address, latitude and longitude, jurisdiction, and/or postal code and (2) an image of a abductee or abductor or associated vehicle. The location information is useful for geographic targeting and the image information is useful for identifying the missing person.

Optionally, AMBER alert distribution decision engine receives as input alternative alerts data, such as alerts for wanted criminals, or location specific public service announcements such as local weather conditions or weather emergencies and local traffic conditions or traffic emergencies. Optionally, the central computer system may be coded to apply the same decision engine code upon receipt of these other types of alert related data. Moreover, textual information and/or image data on scannable or readable medium my be manually entered into an I/O device instead or received via network connection by the central computer system.

Preferably, the AMBER alert distribution decision engine of the central computer system decides what AMBER alert information to transmit to each retail store POS computer system and when to transmit that information, by applying AMBER alert distribution criteria. Once those determinations are made, the AMBER alert distribution decision engine preferably then transmits AMBER alert information. For example, location criteria and time criteria may specify transmitting to all retail stores in a 10, 100, or 500 mile radius of a location identified in the AMBER alert information. Over time, the central computer system may distribute the information to locations in a larger geographic area. For example, if the AMBER alert information was originally transmitted to the retail stores within 10 miles of the abduction, the AMBER alert information may be transmitted 2 hours later to retail stores within 100 miles of the abduction, and 10 hours later to retail stores within 500 miles of the abduction.

Alternatively, the AMBER alert distribution decision criteria may be distributed amongst various computer systems; i.e. from the central computer system to the retail store POS computer system, whereby the retail store POS computer system decides which CIDs get AMBER alert information. The central computer system may transmit certain AMBER alert distribution decision criteria to the computer systems at the local retail stores. The criteria transmitted to different stores may vary from one another depending upon factors such as installed printer types, installed software, and time of day.

The retail store may contain an incentive local computer system and the incentive local computer system may function to identify CIDs associated with transactions that qualify for AMBER alert information, and instruct a printer at the corresponding POS to print the AMBER alert information. Alternatively, the retail store POS computer system may perform these functions.

The incentive local computer system preferably receives AMBER alert information from the central computer system via a network, such as the Internet. The incentive local computer system also preferably uploads to the central computer system transaction data generated in the retail store POS computer system and associated CID from transactions that occurred or are occurring in the retail store. Preferably, the incentive local computer system includes code (part of the AMBER alert distribution decision engine) for analyzing that data to determine to which consumers to distribute specified AMBER alert information. Preferably, the incentive local computer system is programmed to respond to identification of CIDs in an individual transaction by printing or displaying AMBER alert information. The incentive local computer system may apply either trigger criteria or trigger data to each transaction occurring in the retail store POS computer system and then generate a response instructing printing of the AMBER alert information when data for an individual transaction meets the trigger data or trigger criteria.

Each consumer may have multiple CIDs. Preferably, the CID is represented as a bar code so that it can be quickly scanned at checkout by a scanner although any other type of machine readable or non-machine readable implementations for storing or displaying identifications may be used, including magnetic strips, memory chips, and smart cards.

Aspects of the Invention

In one aspect, the invention provides a computer system implemented method for locating an abducted child comprising: applying AMBER alert distribution decision criteria to transaction data; transmitting AMBER alert information to addresses of computers at retail stores meeting said AMBER alert distribution decision criteria; and providing said AMBER alert information to consumers in said retail stores.

In one aspect, the invention provides a computer network system comprising: an AMBER alert distribution decision engine; an incentive local computer system; a printer; wherein said AMBER alert distribution decision engine is configured to apply AMBER alert distribution criteria to transaction data; wherein said incentive local computer system is configured to receive AMBER alert information; and further wherein said incentive local computer system is configured to print said information.

In one aspect, the invention provides a computer implemented system for locating a missing person comprising: structure for applying AMBER alert distribution decision criteria to transaction data; structure for transmitting AMBER alert information to addresses of computers at retail stores meeting said decision criteria; and structure for printing said information.

In one aspect, the invention provides a computer implemented system for locating a missing person comprising: means for applying AMBER alert distribution decision criteria to transaction data; means for transmitting AMBER alert information to addresses of computers at retail stores meeting said decision criteria; and means for printing said information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
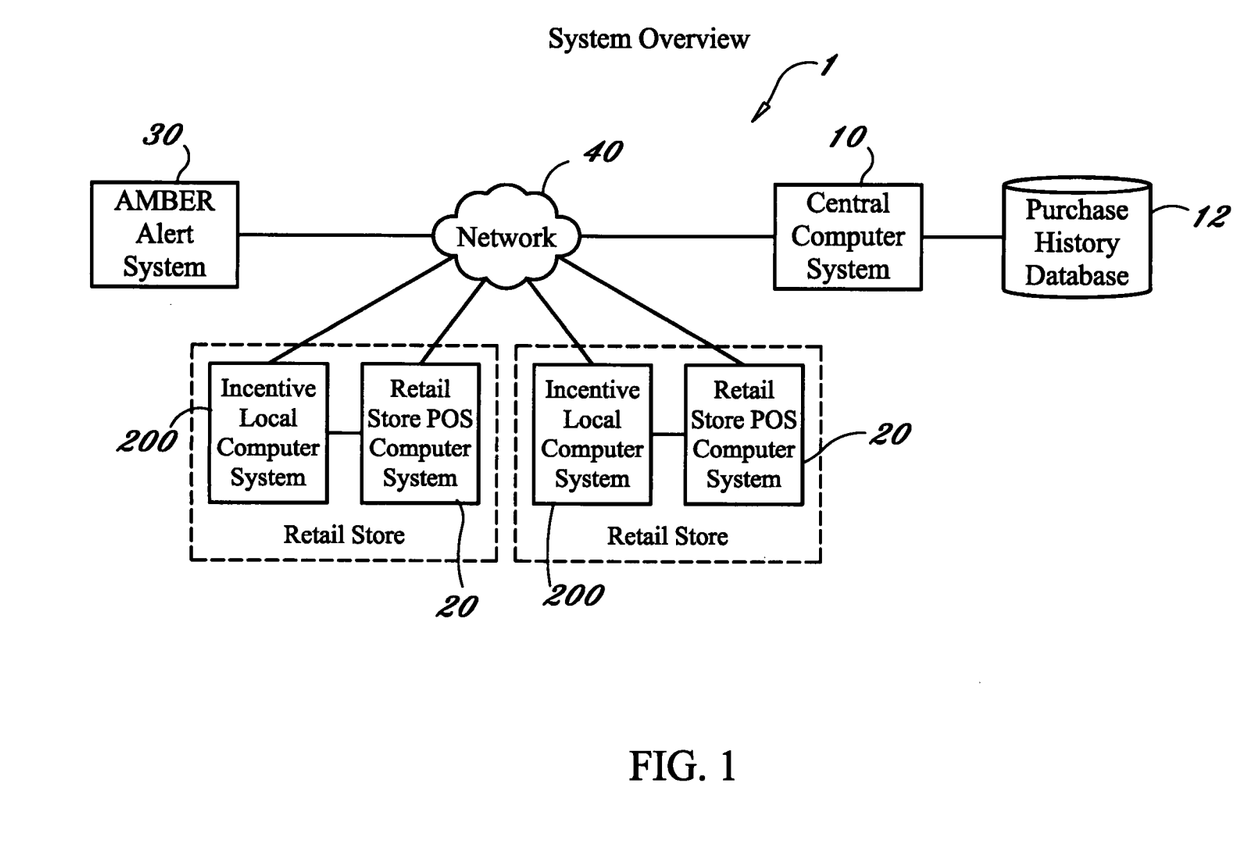
FIG. 1 is a schematic overview of system 1.

FIG. 1 shows an overview of the novel system 1. System 1 includes central computer system 10, retail store POS computer system 20 and incentive local computer system 200 of each retail store, AMBER alert system 30, and network 40.

Each one of the systems 10, 20, 30, and 200 include at least one digital computer including associated central processor, memory, input, and output devices.

The lines connecting elements in FIG. 1 indicate means for data transmission including wire and wireless transmission hardware, data format, and transmission protocols. A line connecting systems 20 and 200 indicate a local connection at the location of a retail store, for example by having incentive local computer system 200 occupy a network node on a token ring network of the corresponding retail store POS computer system 20.

Central computer system 10 comprises at least one purchase history database 12 which stores at least purchase data. Purchase history database 12 may also store AMBER alert information; AMBER alert distribution decisions; AMBER alert distribution decision code; AMBER alert distribution criteria including AMBER alert criteria, retail store criteria, and CID criteria; address data for retail store computer system addresses, and corresponding data such as physical location, postal code, and jurisdiction of retail stores associated with a computer address, retail store chain identification, and transaction data associated with CIDs; trigger criteria; and trigger data. Alternatively, central computer system is associated with two databases: purchase history database 12 and an AMBER alert database. Purchase history database 12 would store purchase data, and AMBER alert database would store the remainder of the aforementioned data. Central computer system 10 may apply trigger data against that transaction data.

Retail store POS computer system 20 represents, for example, a retail store POS computer system for managing sales, inventory, and accounting data for a supermarket.

Incentive local computer system 200 represents, for example, a computer system that performs data analysis on transactions occurring in the retail store POS computer system and generates responses to print at a corresponding POS information for the consumer engaged in the corresponding transaction at that POS.

AMBER Alert System 30 is a system which stores and distributes AMBER alert information about child abductions as it is received from law enforcement. This system can be organized nationally, regionally and/or locally. The AMBER alert system is a nationally coordinated system, whereby the alerts are distributed by each state individually, and within some states by county or city. The AMBER alert information is preferably updated by law enforcement periodically or in real time.

Network 40 refers to a network system, for example a dial up, private digital corporate network, or the Internet. Central computer system 10, retail store POS computer system 20, incentive local computer system 200, and AMBER alert system 30 communicate with each other via network 40.

In one embodiment, the AMBER alert distribution decision engine is installed entirely on central computer system 10, enabling central computer system 10 to identify AMBER alert distribution criteria for distributing AMBER alert information by both an address and CIDs associated with those addresses.

Alternatively, the AMBER alert distribution decision may be installed entirely in another computer system other than central computer system 10. In this embodiment, AMBER alert distribution decisions are transmitted from the location of install of the AMBER alert distribution decision engine to central computer system 10 via a network. In this embodiment, central computer system 10 disseminates the decision to the addresses for the various computer systems of retail stores.

In some embodiments, central computer system 10 stores in a database AMBER alert distribution criteria, and specifically, CID criteria for distributing AMBER alert information to specified consumers. In real time embodiments, central computer system 10 may monitor and respond in real time to identification of CIDs received via a computer system (20, 200) at the retail store to generate and transmit a response to the retail store for printing AMBER alert information while a consumer is engaged in a transaction at a POS.

Preferably, the AMBER alert distribution decision engine transmits from outside the retail store to the retail store trigger criteria or trigger data for issuing AMBER alert information for consumers at the retail store, so that a computer system in the retail store will thereafter recognize transaction data, including data for each individual transaction, and print AMBER alert information for the consumer when transaction data meets the criteria.

Central computer system 10 can also be programmed to transmit, in batch mode, to addresses for computer systems, CID criteria, individual transaction trigger criteria and individual transaction trigger data. For example, central computer system 10 can be programmed to generate AMBER alert distribution decisions periodically, and to periodically transmit corresponding data, such as CIDs, and associated instructions, such as AMBER alert information print instructions, to addresses for computers of retail stores.

Figure 2:
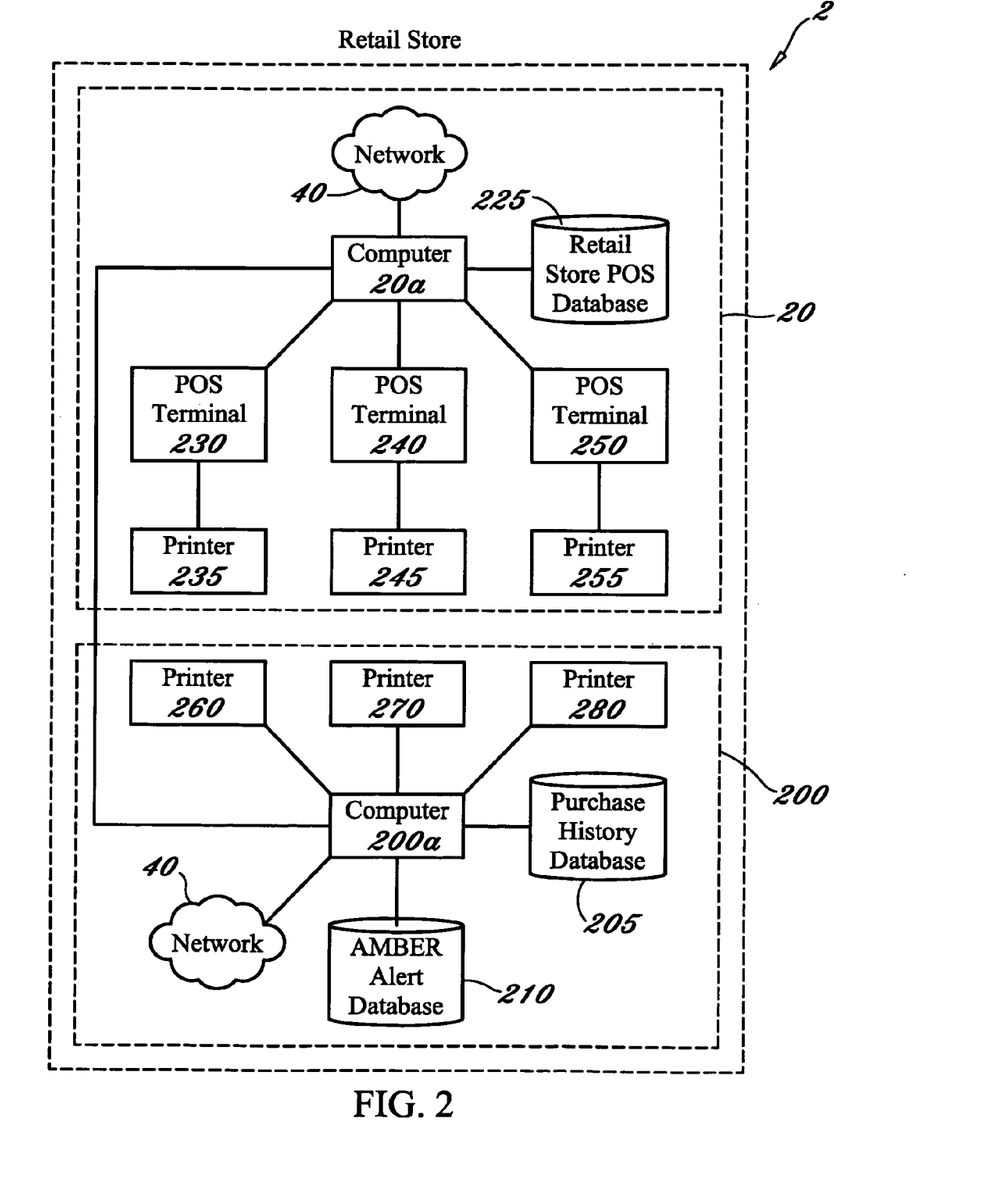
FIG. 2 is a schematic view of retail store POS computer system 20 and incentive local computer system 200 of retail store 2.

FIG. 2 shows a retail store 2 for which there is a retail store POS computer system 20 and incentive local computer system 200. Incentive local computer system 200 includes computer 200a, purchase history database 205, AMBER alert database 210, and printers 260, 270, and 280. Retail store POS computer system 20 includes computer 20a, retail store POS database 225, POS terminals 230, 240, 250, and corresponding POS terminal printers 235, 245, and 255. Both computer systems 20, 200 may connect to network 40. In addition, retail store POS computer system 20 and incentive local computer system 200 are connected to each other.

Retail store POS computer system 20 preferably provides inventory and accounting functions for the retail store. Retail store POS database 225 preferably stores product identifications, corresponding prices, and inventory.

FIG. 2 shows purchase history database 205 and AMBER alert database 210 as part of incentive local computer system 200, and retail store POS database 225 as part of retail store POS computer system 20. Alternatively, the data for these three databases may reside in one or two databases, and any or all of these databases may reside as part of either computer system. Although not shown, all data resident at the retail store may also or alternatively only be stored in a central database associated with central computer system 10.

Preferably, purchase history database 205 includes records containing information for managing accounts of consumers in accordance with the present invention. The records in the purchase history database 205 preferably contain fields for associating consumers with account identifications, transaction locations, dates, and times of purchase. The purchase history database 205 also preferably includes operations for searching, sorting, recombining, and other database functions. Preferably, sales transaction information stored in purchase history database 205 is either retrieved periodically (e.g., daily or weekly) or in real time by the incentive local computer system 200 which transmits that data to the central computer system 10, which uses the information to update the purchase history database 12.

Alternatively, retail store POS computer system 20 may include all of the databases and functionality described above for incentive local computer system 200 such that retail store POS computer system 20 can also perform the functions of incentive local computer system 200 and print AMBER alert information at its own printers (235, 245, 255). In this alternative, incentive local computer system 200 is redundant and need not exist.

POS terminal 230 is connected to computer 20a and printer 235. In one embodiment, AMBER alert information is printed on printer 235.

POS terminal 240 and its printer 245, and POS terminal 250 and its printer 255 are representative that multiple POS stations may exist in a retail store.

Preferably, there is a POS terminal with attached printer for each lane in a retail store.

Printers 260, 270, 280 are part of incentive local computer system 200 and are connected to computer 200a. Printers 260, 270, 280 are associated with the POSs for POS terminals 230, 240, 250, respectively. Preferably, one such printer like printers 260, 270, 280 is located at each POS in a retail store. Thus, if there are ten lanes in the retail store, there are ten printers associated with incentive local computer system 200.

Figure 3:
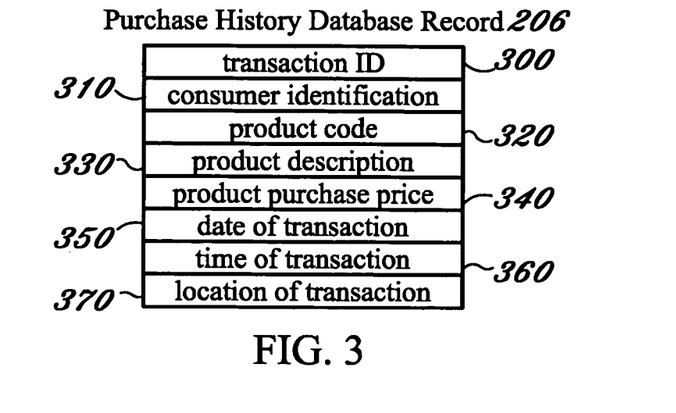
FIG. 3 is a representation of purchase history record 206 in purchase history database 205.

FIG. 3 shows an exemplary record 206 of purchase history database 205 in which purchase history database record 206 preferably includes transaction identification 300 field, consumer identification 310 field, product code 320 field, product description 330 field, product purchase price 340 field, date of transaction 350 field, time of transaction 360 field, and location of transaction 370 field.

Transaction identification 300 field stores a unique identification associated with a transaction.

Consumer identification 310 field stores a CID.

Product code 320 field stores a product code.

Product description 330 field stores any information describing the product sold at retail store. Such information can include what was purchased, i.e. a box of cereal, the size, brand, quantity, etc.

Product purchase price 340 field stores the price list or selling price or amount received for the product purchased in the transaction.

Date of transaction 350 field stores the date of the transaction data for which is stored in purchase data record 206.

Time of transaction 360 field stores the time and date of the transaction.

Location of transaction 370 field stores the geographic location where the transaction took place, such as the address, town, city, county, state, and/or name of retail store.

Figure 4:
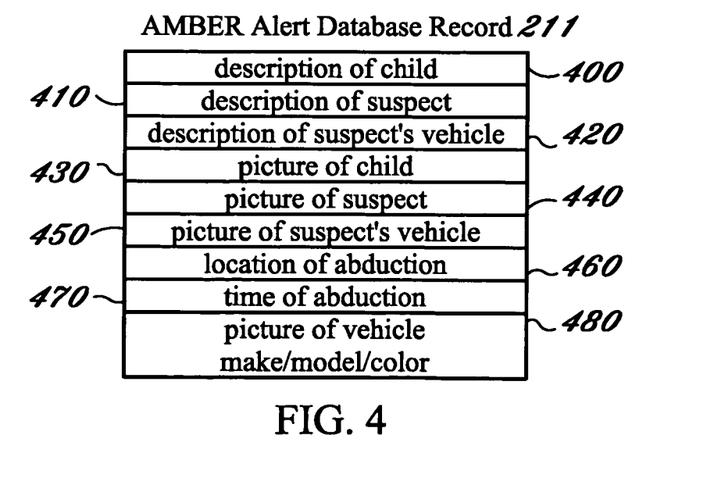
FIG. 4 is a representation of AMBER alert information record 211 in AMBER alert database 210.

FIG. 4 shows an exemplary AMBER alert database record 211 of AMBER alert database 210 in which record 211 represents data stored for a child abduction. It shows field names for storing corresponding data including description of child 400 field, description of suspect 410 field, description of suspect's vehicle 420 field, picture of child 430 field, picture of suspect 440 field, picture of suspect's vehicle 450 field, location of abduction 460 field, time of abduction 470 field, and picture of vehicle make/model/color 480 field.

Description of child 400 field stores information describing the child. Such information can include the child's name, age, sex, race, height, weight, hair color, eye color, and any other information used to describe the missing child.

Description of suspect 410 field stores information describing the suspect. Such information can include the suspect's name, age, sex, race, height, weight, hair color, eye color, and any other information used to describe and/or identify the suspect.

Description of suspect's vehicle 420 field stores information regarding the suspect's vehicle. Such information can include the year, make, model, color, license plate number, the state the vehicle is registered in, vehicle condition, and/or any other information used to describe the vehicle.

Picture of child 430 field stores a photograph of the child in any known image file format, such as .tif, .png, .jpg, .gif, .j2k, .fpx, .pcd, .pdf, etc.

Picture of suspect 440 field stores a photograph of the suspect in any known image file format, such as .tif, .png, .jpg, .gif, .j2k, .fpx, .pcd, .pdf, etc.

Picture of the suspect's vehicle 450 field stores a photograph of the suspect's vehicle in any known image file format, such as .tif, .png, .jpg, .gif, .j2k, .fpx, .pcd, .pdf, etc. Alternatively, picture of suspect's vehicle 450 field stores a photograph of the suspects vehicle's license plate in any known image file format. In another embodiment, picture of suspect's vehicle 450 field can store both an image file of the suspect's vehicle and an image file of the suspects vehicle's license plate. Alternatively, this field can store a computer system generated graphic image of the vehicle or vehicle's license plate, which can be generated by either central computer system 10, retail store POS computer system 20, AMBER alert computer system 30, or incentive local computer system 200.

Location of abduction 460 field stores the location where the abduction took place. Such information can include the state where the abduction took place. Alternatively, the location of abduction 460 field can store the region where the abduction took place, such as the Northeast, the Southeast, the Midwest, etc. Alternatively, the location of abduction 460 field can store the county in which the abduction took place. Alternatively, location of abduction 460 field can store the county, state, and region where the abduction took place.

Time of abduction 470 field stores the time and date of the child abduction.

Picture of vehicle make/model/color 480 field stores a computer system generated graphic of the vehicle make/model/color, which can be generated by either central computer system 10, retail store POS computer system 20, AMBER alert system 30, or incentive local computer system 200.

Figure 5:
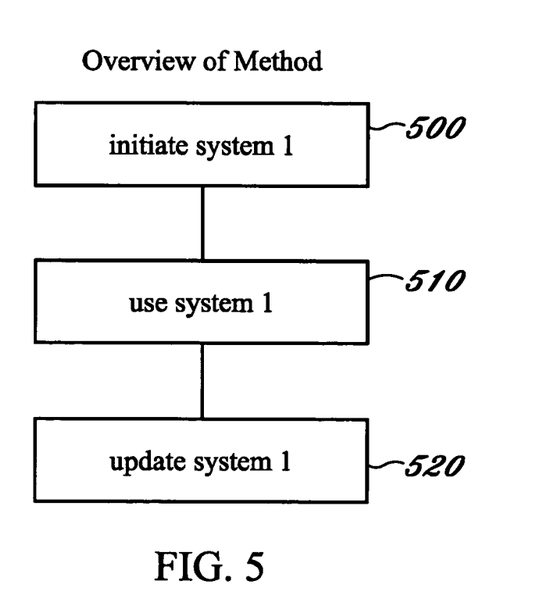
FIG. 5 is a schematic overview of a method for using system 1 to distribute AMBER alert information.

FIG. 5 shows a method overview of the present invention. In step 500, the system 1 is initiated, in step 510 system 1 is used, and in step 520 system 1 is updated.

In step 500, system 1 is initiated. During the initiation step, the networks are set up, the databases schema is implemented, the databases are populated with initial data, and the computers are networked.

Figure 6:
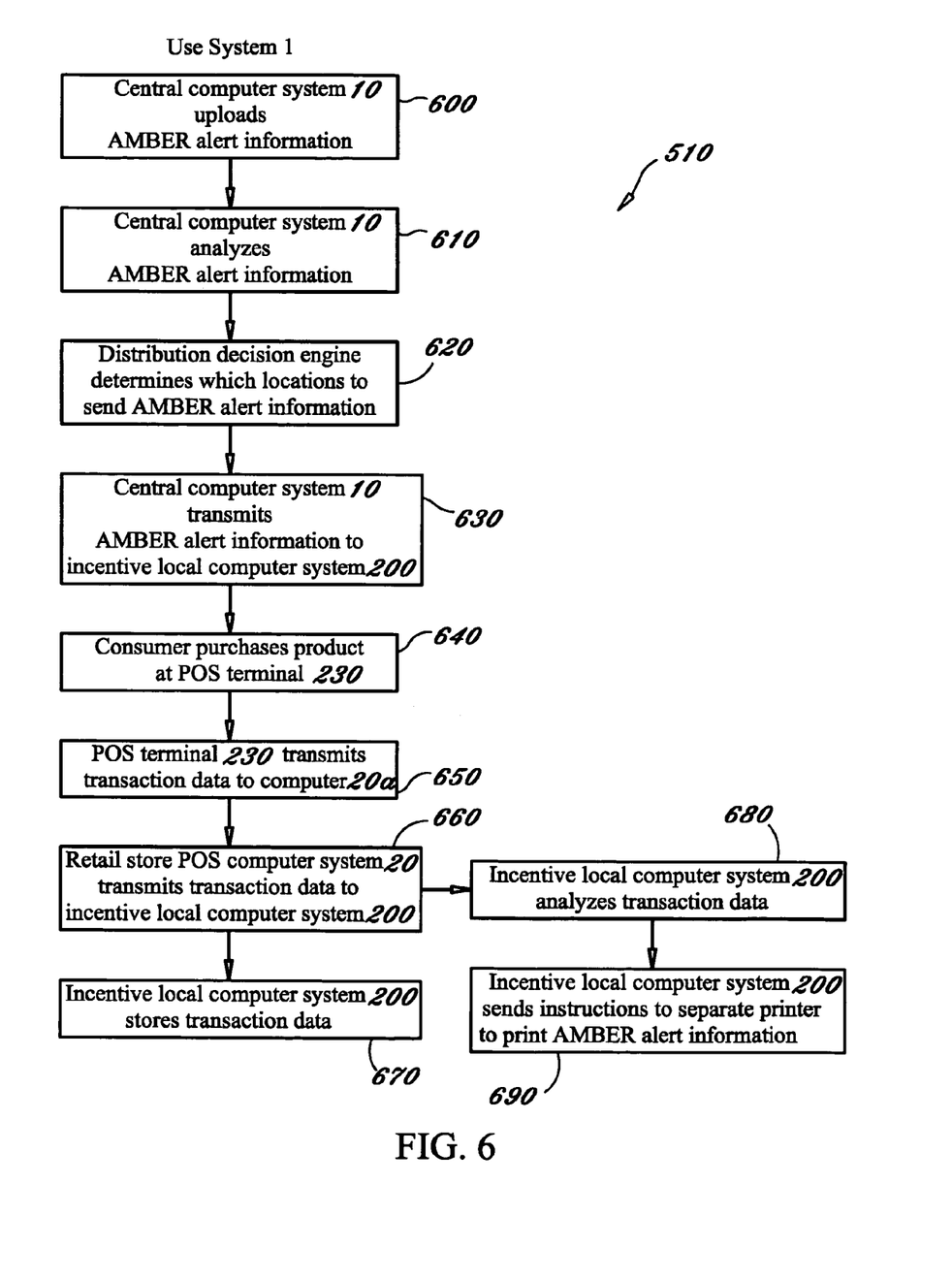
FIG. 6 is a flowchart showing a method for using system 1 to distribute AMBER alert information.

In step 510, system 1 is used. FIG. 6 shows the use of system 1, and such use is described below with reference to FIG. 6.

In step 520, system 1's data is updated. System 1's data is updated when a computer in system 1 receives and stores new AMBER alert information from AMBER alert system 30. System 1 is also updated when a computer system of a retail store transmits data to central computer system 10, such as recent transaction data containing recent purchase history, and when any other of a number of events occur that require storage of new corresponding data.

FIG. 6 is a flowchart showing a method for using system 1.

In step 600, AMBER alert system 30 transmits AMBER alert information for an event to central computer system 10. This information can be uploaded periodically (daily or weekly) or in real time. Central computer system 10 stores the received information in database 12.

In the alternative, central computer system 10 can receive alternative event information having the format of AMBER alert information, that is, event information including a location identifier, an associated time, and event description information, such as information related to criminal activity, weather, traffic, or other localized in time and physical location events. Central computer system 10 can execute AMBER alert distribution decision engine to apply alert decision criteria to that event information to generate AMBER alert distribution decision for distributing that event information to addresses of computers in retail stores.

In step 610, as part of the AMBER alert distribution decision engine execution, central computer system 10 analyzes the received AMBER alert information to determine what types of information are present, such as image information, abductor information, abductee information, location information, time and date information.

In step 620, as part of the AMBER alert distribution decision engine execution, central computer system 10 provisionally determines from the results of step 610, what information should be printed in retail stores. For example, central computer system 10 determines whether to print in retail stores a photograph of the child and/or a description of the missing child, a photograph of the suspect and/or a description of the suspect, photographs of both the abducted child and the suspect, or no photographs.

In step 620, as part of the AMBER alert distribution decision engine execution, central computer system 10 determines addresses of computers in retail stores to which to send AMBER alert information for the event.

In this step, based upon the time the abduction took place, and/or the population density in the area, the AMBER alert distribution decision engine determines where to transmit the AMBER alert information. Immediately after an abduction takes place, the information is transmitted to the retail stores that are determined to be the highest priority for transmission of the information. As time progresses, the information is transmitted to retail stores in a larger geographic region and eventually the AMBER alert information can be distributed to retail stores nationally and internationally. For example, if a child is not recovered within 24 hours, the radius of retail stores where the AMBER alert information is sent is expanded.

This time limit can be set in hours, days, or weeks. For example, if a child is abducted in California on Tuesday, AMBER alert distribution decision engine will transmit the AMBER alert information to retail stores in California on Tuesday. If by Friday, the child has not been recovered, the central computer system 10 will transmit the information to states in the same region as California, such as Oregon, Washington, Idaho, Utah, Nevada, and Arizona. If a week from the abduction the child is not recovered, the AMBER alert distribution decision engine will transmit the information to all states. System 1 may be responsive to change transmission priority based upon police leads and other developments, such as information that might shift the suspected locations of the abduction.

Once the retail stores to which the information is being sent is determined, as part of the AMBER alert distribution decision engine execution, central computer system 10 determines CID by executing code applying CID criteria to corresponding data.

In step 630, central computer system 10 transmits the AMBER alert information and related individual transaction trigger criteria or data to the addresses of the computer systems identified in step 620. One example of information transmitted is shown in FIG. 4.

In step 640, a consumer purchases at least one product or service at a POS terminal 230. The retail store POS terminal 230 captures transaction data, preferably including a CID.

In step 650, POS terminal 230 transmits transaction data to retail store POS computer system 20 in real time.

In step 660, retail store POS computer system 20 transmits transaction data to incentive local computer system 200 in real time via wire or wireless transmission hardware located at the retail store.

In step 670, incentive local computer system 200 stores the transferred transaction data in purchase history database 205.

In step 680, incentive local computer system 200 applies individual transaction criteria and data to the data for the individual transaction just received from POS terminal 230. If it identifies a criteria or data match, it generates a response signal for printer 260 to print AMBER alert information for the consumer at the POS.

In step 690, incentive local computer system 200 transmits the response signal to print data to printer 260.

The photos that are printed can be sponsored by a company, and that company's sponsorship, such as their name, logo, trademark, other identifying characteristic, may be printed or presented along with the AMBER alert information.

Alternatively, incentive local computer system 200 transmits the response signal to, a printer attached to a kiosk, a lotto terminal printer, a pharmacy printer, and/or any other printer in the retail store where the consumer happens to have been identified. Alternatively, the incentive local computer system transmits the response wirelessly to a receive device carried by the consumer, such as a PDA, cell phone or computer.

In another embodiment, the incentive local computer system 200 can send an email with the AMBER alert information to the consumer at the consumer's email address if the CID criteria and/or AMBER alert distribution criteria is met. In another embodiment, the incentive local computer system 200 can send the AMBER alert information to a consumer at the consumer's personal web page if CID criteria and/or AMBER alert distribution criteria is met. In order for the information to be emailed or sent to a personal web page, the consumer must first register with central computer system 10 by supplying an email address and optionally other personal information. The central computer system 10 uploads AMBER alert information and analyzes that information. The AMBER alert distribution decision engine determines which email addresses or personal web pages to send the information to based upon AMBER alert distribution and CID criteria. The criteria used in determining which consumers to send the AMBER alert information can be the AMBER alert distribution criteria and/or CID criteria. The central computer system 10 then transmits the information either periodically or in real time to consumers at their email address or at their personal web page.

Advantages of emailing the information or posting it to a consumer's web page include the consumer getting the information as soon as it is uploaded by central computer system 10 and the consumer being able to forward the information to their contacts, thereby expediting the process and reaching a larger population.

In one embodiment, the system has the ability to distribute WANTED messages. For instance, the system can distribute descriptions of criminal suspects and/or their vehicles, photos of suspects and/or their vehicles, or computer system graphics of the suspect, the suspect's vehicle, or the suspect's license plate. The system is able to print information on suspects for child abductions, as well as information on suspects for any crimes, as long as this data is available via a network. The criteria that is used in determining which consumers to distribute the WANTED messages to is similar to AMBER alert distribution criteria and/or CID criteria. The information is transmitted and distributed to consumers in a similar manner to that described above with respect to AMBER alert information.

I claim:

1. A computer implemented method for aiding in locating an abducted child comprising:
 applying, using a computer, AMBER alert distribution decision criteria to corresponding data and AMBER alert information;
 wherein said AMBER alert distribution decision criteria includes at least one of the following: (1) consumer identification (CID), (2) product code, (3) product description, (4) product purchase price;
 transmitting, from said computer, said AMBER alert information to addresses of computers at retail stores meeting said AMBER alert distribution decision criteria; and
 printing said AMBER alert information at points of sale (POSs) at said retail stores in connection with consumer transactions in said retail stores to provide said AMBER alert information to consumers.

2. The method of claim 1, wherein said AMBER alert information comprises at least one of the following:
 description of said child;
 description of a suspect;
 description of said suspect's vehicle;
 photograph of said child;
 photograph of said suspect;
 photograph of said suspect's vehicle;
 location of said abduction; and
 time of said abduction.

3. The method of claim 1 wherein said corresponding data comprises at least one of the following: CID consumerID, product code, product description, and product purchase price; and
 wherein said AMBER alert information includes at least one of the following: description of child, description of suspect, description of suspect's vehicle, picture of child, picture of suspect, picture of suspect's vehicle, location of abduction, time of abduction.

4. A computer implemented system for aiding in locating an abducted child comprising:
 a central computer system for applying AMBER alert distribution decision criteria to corresponding data and AMBER alert information;
 wherein said AMBER alert distribution decision criteria includes at least one of the following: (1) consumer identification (CID), (2) product code, (3) product description, (4) product purchase price;
 structure for transmitting said AMBER alert information to addresses of computers at retail stores meeting said AMBER alert distribution decision criteria; and
 a printer for printing said information at points of sale (POSs) in said retail stores in connection with consumer transactions in said retail stores to provide said AMBER alert information to consumers at said POSs.

5. The system of claim 4, wherein said AMBER alert information is stored by said central computer system and comprises at least one of the following:
 description of said child;
 description of a suspect;
 description of said suspect's vehicle;
 photograph of said child;
 photograph of said suspect;
 photograph of said suspect's vehicle;
 location of said abduction; and
 time of said abduction.

6. The system of claim 5 wherein said corresponding data is stored by said central computer system and comprises at least one of the following: consumer identification (CID), product code, product description, product purchase price; and
 wherein said AMBER alert information is stored by said central computer system and comprises at least one of the following: description of child, description of suspect, description of suspect's vehicle, picture of child, picture of suspect, picture of suspect's vehicle, location of abduction, time of abduction.

7. A computer implemented system for distributing AMBER alert information to consumers of retail stores, comprising:
 a first computer system;
 wherein said first computer system stores first AMBER alert distribution criteria and first corresponding data;
 wherein said first computer system is structured to run a first AMBER alert distribution decision engine to generate a first AMBER alert distribution decision, by applying said first AMBER alert distribution criteria to at least part of said AMBER alert information and to at least part of said first corresponding data;
 wherein said first AMBER alert distribution decision specifies at least both of (1) a network address associated with a retail store and (2) a consumer identification (CID) which is associated with said retail store;
 output structure, for providing at a point of sale (POS) in said retail store, information to consumers; and
 code instructing said output structure to present at said POS at least part of said AMBER alert information.

8. The system of claim 7 wherein said first AMBER alert distribution criteria includes demographic data criteria.

9. The system of claim 7 wherein said first AMBER alert distribution criteria includes transaction data criteria.

10. The system of claim 7 wherein said first AMBER alert distribution criteria includes prior product purchase criteria.

11. The system of claim 7 wherein said first AMBER alert distribution criteria includes at least one of the following: (1) product code, (2) product description, (3) product purchase price.

12. The system of claim 7 wherein said first computer system is associated with a retail store and said first AMBER alert distribution decision includes said CID.

13. The system of claim 7 wherein said output structure comprises a printer.

14. The system of claim 7 wherein said output structure comprises a video display device.

15. The system of claim 7 wherein said AMBER alert information comprises an image of a person.

16. The system of claim 7 wherein said AMBER alert information comprises time information.

17. The system of claim 7 wherein said AMBER alert information comprises geographic location information.

18. The system of claim 7 wherein said first AMBER alert distribution decision specifies increasing geographic distribution of AMBER alert information over time.

19. The system of claim 7 wherein:
 said first computer is a central computer system;
 further comprising a second computer system including said output structure;
 said second computer system has associated therewith said network address and said retail store; and
 network structure over which said first computer system can transmit data to said second computer system.

20. The system of claim 19 wherein said second computer system is structured so that said output structure provides at least part of said AMBER alert information in real time when said CID is recognized by said second computer system.

21. The system of claim 19 wherein said second computer system is a POS computer system.

22. The system of claim 19 wherein said second computer system is an incentive local computer system.

23. The system of claim 19 wherein said second computer system stores second AMBER alert distribution criteria and second corresponding data;
wherein said second computer system is structured to run a second AMBER alert distribution decision engine to generate a second AMBER alert distribution decision, by applying said second AMBER alert distribution criteria to at least part of said AMBER alert information and to at least one of the following: (1) product code, (2) product description, (3) product purchase price.

24. The system of claim 23 wherein said second AMBER alert distribution criteria includes demographic data criteria.

25. The system of claim 23 wherein said second AMBER alert distribution criteria includes transaction data criteria.

26. The system of claim 23 wherein said second AMBER alert distribution criteria includes prior product purchase criteria.

27. The system of claim 23 wherein said second AMBER alert distribution criteria includes current product purchase criteria.

28. The system of claim 23 wherein said second AMBER alert distribution decision includes said CID.

29. A computer implemented method for distributing AMBER alert information to consumers of retail stores, comprising:
storing in a first computer system first AMBER alert distribution criteria and first corresponding data;
running in said first computer system a first AMBER alert distribution decision engine to generate a first AMBER alert distribution decision, by applying said first AMBER alert distribution criteria to at least part of said AMBER alert information and to at least part of said first corresponding data;
wherein said first AMBER alert distribution decision includes at least both of (1) a network address associated with a retail store and (2) a consumer identification (CID) associated with said retail store; and
providing, using output structure at a point of sale (POS) in said retail store, information to consumers; and
instructing said output structure to present at said POS at least part of said AMBER alert information.

30. The method of claim 29 wherein:
said first computer is a central computer system;
further comprising a second computer system including said output structure;
said second computer system has associated therewith said network address and said retail store; and
transmitting data over network structure from said first computer system to said second computer system.

31. The method of claim 30 further comprising said output structure providing in real time at least part of said AMBER alert information when said CID is recognized by said second computer system.

* * * * *